United States Patent
Lyles et al.

(10) Patent No.: US 7,451,260 B2
(45) Date of Patent: Nov. 11, 2008

(54) INTERLEAVE MECHANISM FOR A COMPUTING ENVIRONMENT

(75) Inventors: Christopher L. Lyles, Ft. Collins, CO (US); Eric R. Delano, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 110 days.

(21) Appl. No.: 11/584,943

(22) Filed: Oct. 23, 2006

(65) Prior Publication Data

US 2008/0162774 A1 Jul. 3, 2008

(51) Int. Cl.
*G06F 13/00* (2006.01)
(52) U.S. Cl. ........................ 710/316; 710/317
(58) Field of Classification Search ............... 710/110, 710/11, 113, 114, 240–244, 316, 317
See application file for complete search history.

(56) References Cited

U.S. PATENT DOCUMENTS

| | | | | |
|---|---|---|---|---|
| 6,751,698 | B1* | 6/2004 | Deneroff et al. | 710/317 |
| 7,165,132 | B1* | 1/2007 | Asato et al. | 710/100 |
| 7,237,144 | B2* | 6/2007 | Safford et al. | 714/11 |
| 7,240,160 | B1* | 7/2007 | Hetherington et al. | 711/122 |
| 7,277,449 | B2* | 10/2007 | Garinger et al. | 370/419 |

\* cited by examiner

*Primary Examiner*—Khanh Dang (57) ABSTRACT

Provided is a system to communicate data in a computing environment, comprising an interleaving mechanism operable to interleave data being communicated across the computing environment according to a selected interleaving protocol; and an interleaving instruction set operable on the interleaving mechanism providing operating instructions to the interleaving mechanism in accordance with the selected interleaving protocol wherein the data can be interleaved between one or more data channels of the computing environment and within one or more data channels of the computing environment.

20 Claims, 5 Drawing Sheets

INTERLEAVE MECHANISM FOR A COMPUTING ENVIRONMENT

BACKGROUND

The clock rate and processing speed of microprocessor cores, such as are used in a computer central processing unit (CPU), typically increase with the introduction of new core types and families. The clock rate is the frequency, measured in cycles per second (Hertz), at which a computer performs operations such as adding two numbers or transferring a value from one component to another. The data on which the microprocessor operates are delivered to it from other devices and components, each connected directly or indirectly to the microprocessor via sets of wires called data busses connected to ports on the microprocessor.

As the speed of a microprocessor core increases, the speed with which the core is able to process data also increases. However, the speed of the computer components other than the core, such as memory delivering data to the core, may not increase, or may not increase as quickly as the speed of the core. In addition, there are typically many different devices and components to and from which the core communicates data, and many different external links to the core through which the data are communicated. Such a collection of data links is referred to as a link fabric. Typically data from different sources are delivered to the processor through the link fabric at different speeds and at different clock frequencies. One problem that arises as microprocessor core speed increases and exceeds the bandwidth of the data from the devices connected to it is how to interface multiple agents on a link fabric to a fast core so that the core's processing capability is efficiently utilized.

Current solutions for increasing bandwidth to a core include increasing the number of interlinks and/or the speed of the interlinks, such as by increasing link interconnect clock speeds. Also, wider datapaths capable of delivering more data per cycle to the core have been implemented. These solutions typically require major computer manufacturer, chipset, and link specification work to align on a new baseline infrastructure.

SUMMARY

Provided is a system to communicate data in a computing environment, comprising an interleaving mechanism operable to interleave data being communicated across the computing environment according to a selected interleaving protocol; and an interleaving instruction set operable on the interleaving mechanism providing operating instructions to the interleaving mechanism in accordance with the selected interleaving protocol wherein the data can be interleaved between one or more data channels of the computing environment and within one or more data channels of the computing environment.

It is to be understood that both the foregoing general description and the following detailed description are exemplary and explanatory and are intended to provide further explanation of the herein disclosed systems and methods as claimed.

BRIEF DESCRIPTION OF THE DRAWINGS

The accompanying Figures, which are included to provide a further understanding of the invention and are incorporated in and constitute a part of this specification, illustrate implementations of the herein described systems and methods and together with the description serve to explain the principles of the herein described systems and methods.

In the drawings.

DETAILED DESCRIPTION

Overview:

One type of link fabric is called a router crossbar (XBAR). An XBAR comprises a characteristic matrix of switches between the inputs and the outputs of the XBAR. If the XBAR has X inputs and Y outputs, then it has a matrix of X times Y switches at cross-points or places where there the "bars" "cross". The router function of the XBAR configures the switches to forward data from a sender across the XBAR along a selected path from the inputs of the XBAR to its outputs, to direct the data to its intended receiver.

The XBAR must be able to accommodate any component which is switched through it. Therefore, the effective frequency of an XBAR interface being shared by multiple components cannot be greater than the frequency of the slowest component switched through that interface. Since data flows between components and the core through the XBAR, the maximum bandwidth for a link-to-core connection is thus limited by the frequency of the slowest component. With current link technology lagging microprocessor core frequencies, this leads to a bottleneck into and out of the microprocessor core. This bottleneck will likely get worse in the future as silicon manufacturing technology continues to advance core speeds faster than link interconnect speeds.

Each XBAR router interface typically comprises two virtual channels to deliver request and response traffic independently to each sender. The router arbitrates between multiple senders on respective virtual channels sending data to a single receiver, and grants a crossbar connection to one of the senders for the duration of a data packet. After the sender sends a data packet, the router may grant a crossbar connection to a different sender, which sends a data packet, even if the first sender has another packet to send. Packet traffic through the XBAR is then interleaved between granted senders on different channels, on data flit boundaries. If the receiver, such as a core, is able to accommodate data faster than a sender can provide it, the receiver waits until the sender can send more data, resulting in inefficient operation of the receiver.

Figure 1:
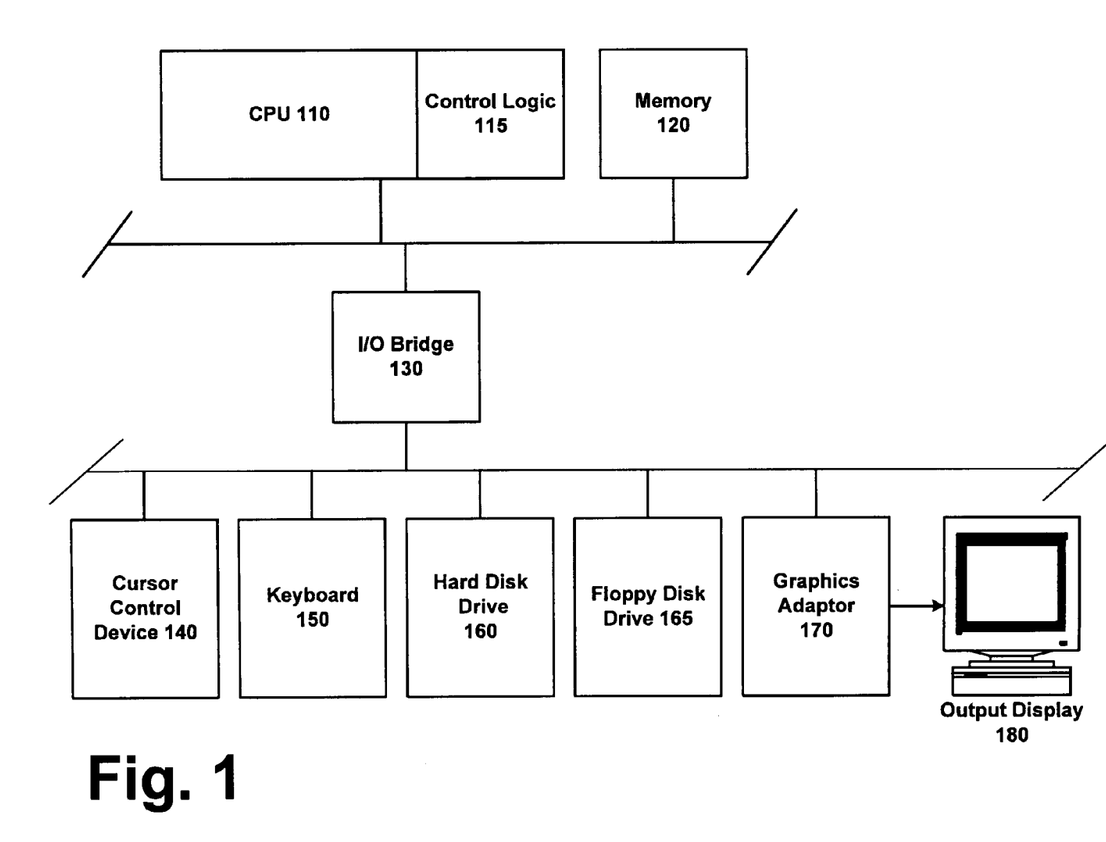
FIG. 1 is a block diagram of a computer.

FIG. 1 is a block diagram of a computer. Central processing unit (CPU) 110 having control logic block 115 is connected to main memory 120 through a data bus. The CPU 110 and main memory 120 are connected to other devices through an I/O bridge 130. The other devices include devices for a user to control or input data into the computer, for example a cursor control device 140, such as a mouse, and a keyboard 150. The other devices also include devices for storing data and providing data to the CPU 110 and/or memory 120, such as a hard disk drive 160 and floppy disk drive 165. The other devices also include a graphics adapter 170, which can send data from the computer to an output display 180.

The speed of the CPU 110 may be faster than the speed of one or more of the components connected through the XBAR. If so, the efficiency of the CPU can be improved by combining data from multiple devices as it is delivered to the CPU. In particular, data from the components can comprise multiple message classes which are distinguished from each other, such as by their speed. For example, memory read traffic into a fast core from multiple memory controllers can constitute a message class. The memory traffic into the CPU is typically often dominated by one memory channel. Allowing multiple memory controllers to share a single channel to the core by interleaving their data packets on flit boundaries to match the demands of the core can boost bandwidth to the core.

Figure 2:
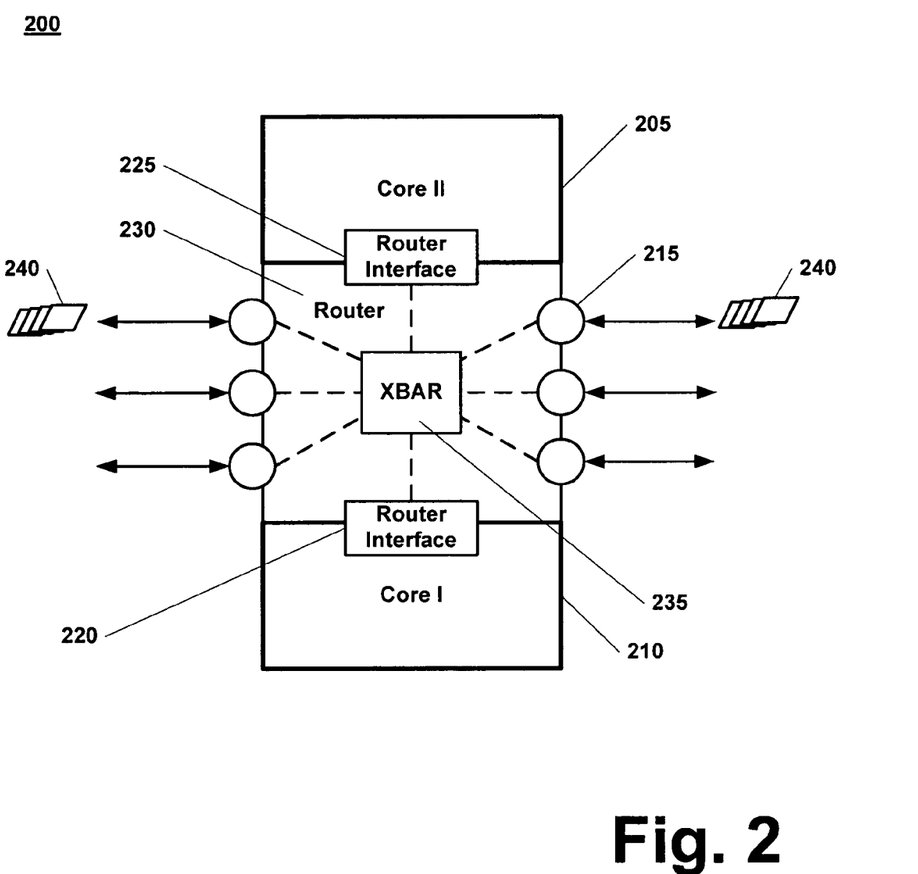
FIG. 2 is an illustration of a microprocessor with two processing cores, and having an XBAR with interfaces to the two cores and a plurality of components in accordance with an example embodiment of the herein described systems and methods.

FIG. 2 is an illustration of a microprocessor 200, such as can be included in CPU 110. The microprocessor comprises a first processing core 210, having router interface 220 to XBAR 235; and a second processing core 205, having router interface 225 to the XBAR 235. The XBAR 235 has a plurality of interfaces 215 to other components of the computer. Data are communicated between the other components and the XBAR in data packets 240. The cores process data at a characteristic speed. The processing speed of the cores may be faster than the speed with which data is sent to the cores.

Figure 3:
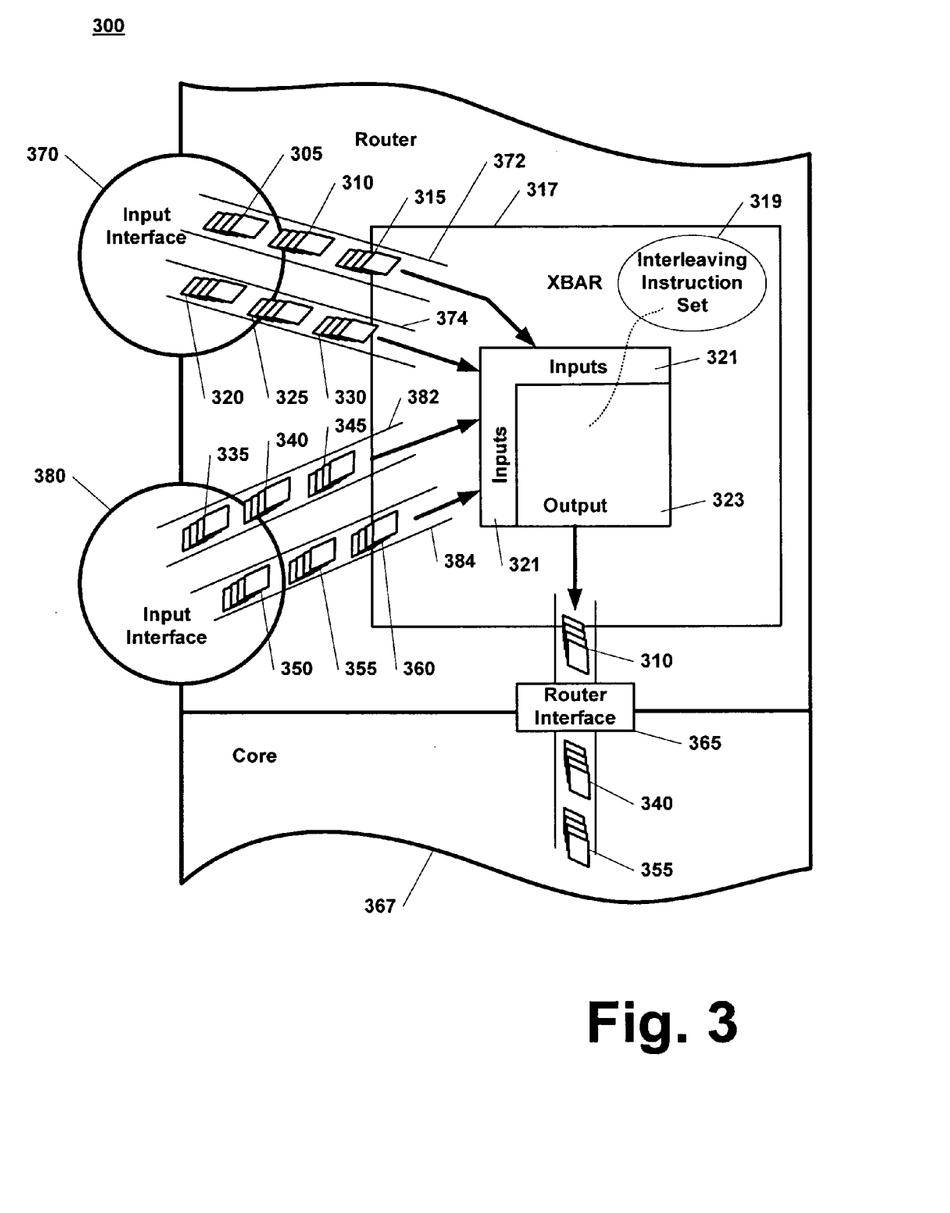
FIG. 3 shows an XBAR receiving data over a plurality of channels and interleaving the data on a flit basis for delivery to a core, in accordance with an example embodiment of the herein described systems and methods.

FIG. 3 shows a router crossbar receiving data over a plurality of input interfaces via a plurality of channels, and interleaving the data on a flit basis. The channels may be virtual channels. A first input interface 370 delivers via a first channel 372 data in packets disassembled into flits 305, 310, 315. The same input interface 370 delivers via a second channel data 374 in packets disassembled into flits 320, 325, 330. A second input interface 380 delivers via a third channel 382 data in packets disassembled into flits 335, 340, 345; and via a fourth channel 384 delivers data in packets disassembled into flits 350, 355, 360. The data flits are sent to inputs 321 of an XBAR 317. The flits are interleaved according to an interleaving instruction set 319, in accordance with a selected interleaving protocol. The interleaved flits are sent to an output 323 of the XBAR 317 through a router interface 365 to a processing core 367. Flits 355, 340, 310 have been interleaved from the fourth, third and first channels respectively.

An interleaving mechanism is operable to interleave the sources of data in accordance with a selected interleaving protocol. An interleaving instruction set 319 operable on the interleaving mechanism provides operating instructions to the mechanism. For example, in an illustrative implementation the router arbitration logic implements a state machine that can track up to N granted senders of data through the XBAR to a single virtual channel to a processor core. A find-first algorithm can be used to fill vacant grant slots and receive data packets at the XBAR inputs. A rotation algorithm can interleave portions of the packets between the current number of granted senders for outbound traffic through the XBAR output port to the receiving core. Depending on the relative speed of the links and the core, a minimum number of links will be required for bandwidth matching.

For example, in an illustrative implementation the data rate of two links from memory with a speed of 5 GB/sec can be combined to match the bandwidth of a receiving processor core with a speed of 10.2 GB/sec. In this operation, control bits can be sent with the data to the receiving core to track which of the senders is currently delivering data and packet-ripper logic within the receiving core can track which of the senders is currently delivering data. Also, the processor can implement a separate assembly queue for data from each of the N potential sources.

Figure 4:
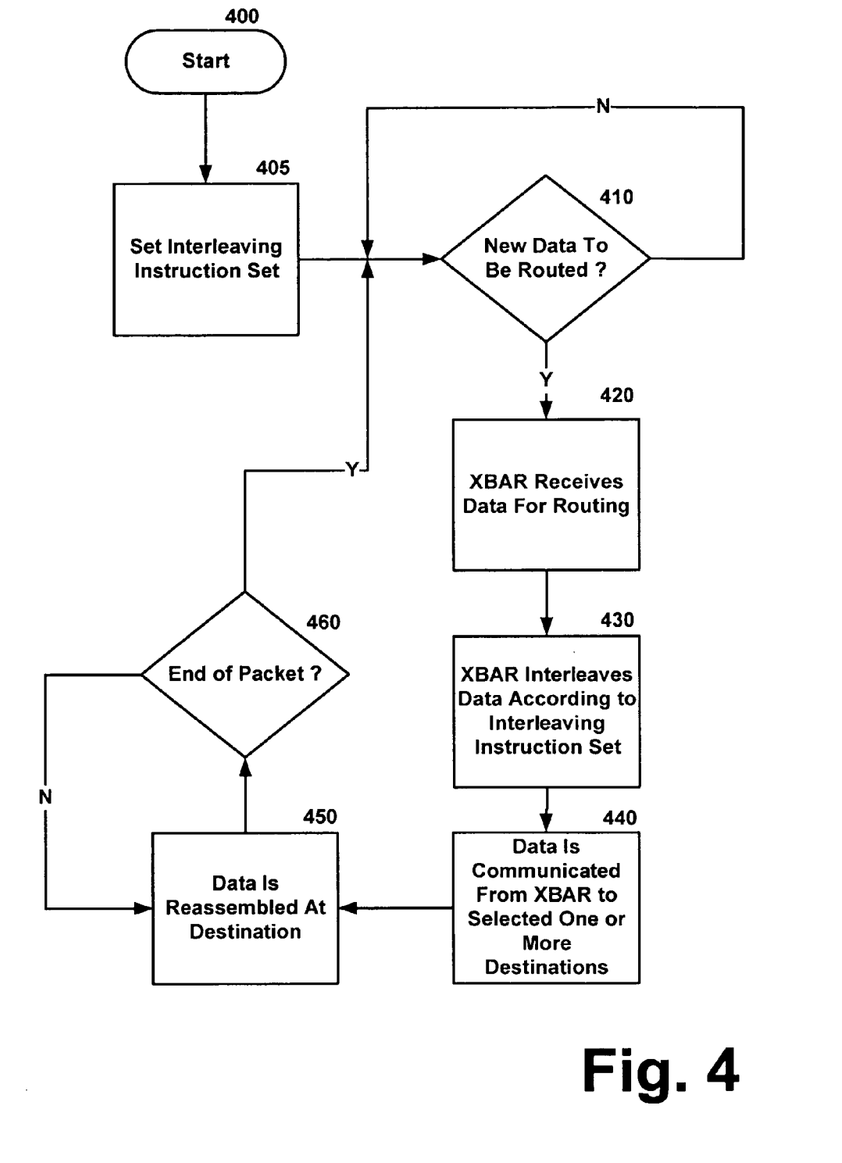
FIG. 4 is a flow chart showing an illustrative first in first out (FIFO) method of interleaving and reassembling data, in accordance with an example embodiment of the herein described systems and methods.

FIG. 4 is a flow chart showing exemplary processing performed when processing data according to an exemplary first in first out (FIFO) method. In an illustrative implementation, the exemplary FIFO method can comprise receiving data at a plurality of input interfaces of a router crossbar, interleaving the data, routing it through the crossbar to its destination, and reassembling the data at its destination. As is shown in FIG. 4, processing begins at block 400, and an interleaving instruction set of the router is set in accordance with a selected interleaving protocol at block 405. A plurality of input interfaces to a router are monitored to determine whether new data packets to be routed through the XBAR have been received at one or more of the input interfaces at block 410. If no new data is to be routed, the input interfaces continue to be monitored for data. If data to be routed has been received, the XBAR receives the data for routing at block 420. The XBAR disassembles the data packets, interleaves the disassembled data from the one or more interfaces according to the interleaving instruction set at block 430, and directs the data to one or more selected destinations. The data is then communicated through the XBAR to the selected one or more destinations at block 440. When the data arrives at its selected destination, it is reassembled at block 450. When each portion of data is assembled, a determination is made whether that portion contains the end of the packet at block 460. If it is not the end of the packet, additional data portions continue to be reassembled until the end of packet is found. When the end of packet is found the packet is completely reassembled and is processed, and the method continues to monitor the input interfaces for data at block 410.

Figure 5:
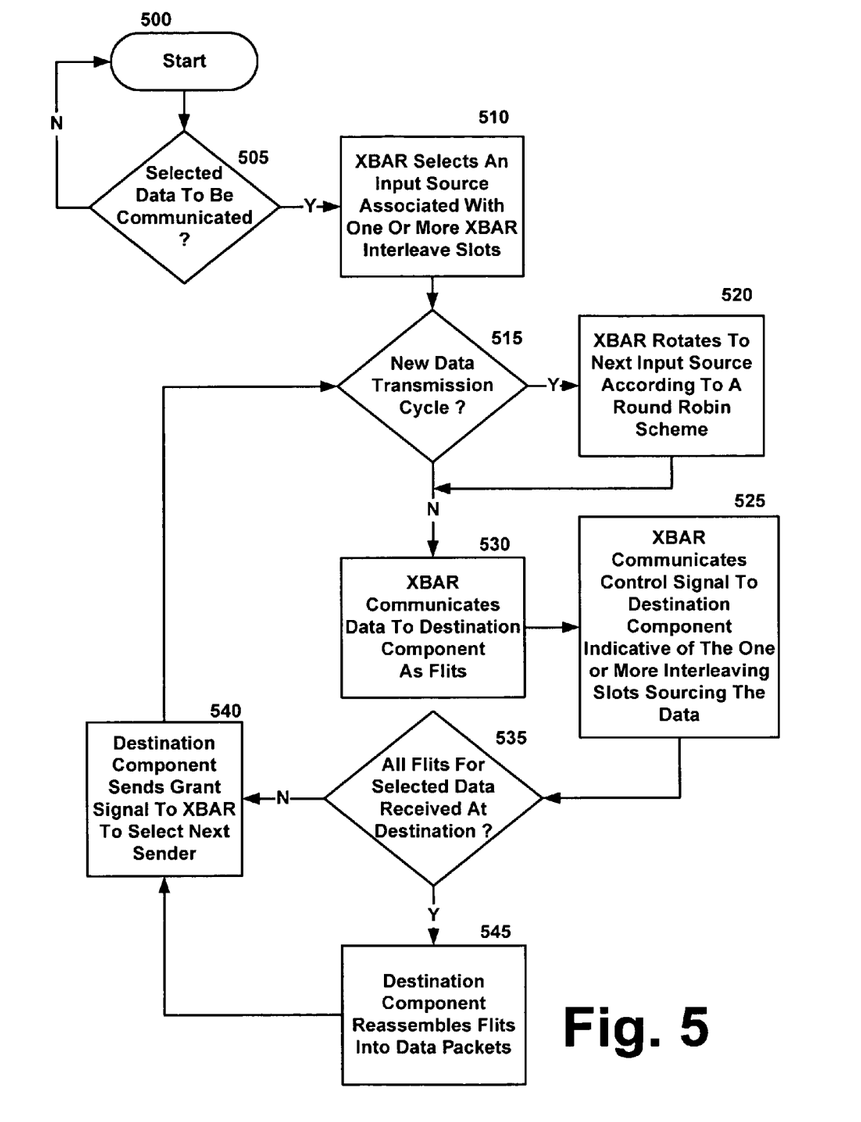
FIG. 5 is a flow chart showing an illustrative round robin method of interleaving and reassembling data, in accordance with an example embodiment of the herein described systems and methods.

FIG. 5 is a flow chart showing an exemplary round robin method of interleaving and reassembling data. Processing starts at block 500, and a determination is made if there is selected data to be communicated at block 505. If there is no data to be communicated, the method returns to block 500 until there is selected data to be communicated. However, if there is data to be communicated, the XBAR selects an input source associated with one or more XBAR interleave slots at block 510. A determination is then made whether a new data transmission cycle has started at block 515 based on being enabled by the receiver's flow control mechanism. If there is no new data transmission cycle, the XBAR communicates the data to its destination component as flits at block 530. However, if a new data transmission cycle has started, the XBAR rotates to the next input source according to a round robin scheme at block 520, and the XBAR communicates that source's data to its destination component as flits at block 530. After the XBAR communicates the flits to their destination at block 530, the XBAR communicates a control signal to the destination component, indicating the one or more interleaving slots sourcing the data at block 525. A determination is made if all flits for the selected data have been received at their destination at block 535. If all of the flits have not been received, the destination component sends a grant signal to the XBAR to select the next sender at block 540. However, if all the flits have been received, the destination component reassembles the flits into data packets at block 545, then the destination component sends a grant signal to the XBAR to select the next sender at block 540. After sending a grant signal to the XBAR, the method again determines whether a new data transmission cycle has started at block 515. The method of flit interleaving illustrated in FIG. 5 can be used in conjunction with the method illustrated in FIG. 4 for interleaving between channels.

For example, in accordance with FIGS. 2 and 3, in an illustrative implementation in an explicitly parallel instruction computing (EPIC) based microprocessor, six external links 215 interface to two processor cores 205, 210 through an eight-port on-chip router crossbar 235. The external links connect, for example, to various components and devices. The router crossbar 235 implements connections as needed between the external links 215 and the processor cores 205, 210. Each router interface 220, 225 to a core comprises two virtual channels to deliver request and response traffic independently. The router can arbitrate between multiple senders each on a different channel, destined for a receiver on a particular virtual channel. The XBAR grants a crossbar connection to each of the senders one at a time for the duration of a packet, and interleaves their packets. The packets are disassembled into flits and the flits are cached in queues, each input channel having its own queue (not shown). The flits are interleaved and forwarded through the XBAR output port to the router interface 365, then sent to the receiver for reassembly into packets, as described hereinbefore.

Control bits are sent with the data flits to the receiving processor core to track which of the senders sent each flit, and the receiving packet-ripper logic within the processor implements multiple assembly queues for data from each of the potential N sources. In an illustrative implementation, the flit interleaving feature is implemented modularly for all router output ports, but is only enabled via configuration for ports whose speed is such that they can make efficient use of it. If microprocessor core frequency scales up within a process generation, overhead in the bandwidth matching can still allow for maximum supplied bandwidth to the cores. If N is set too high and the core is over-supplied, flow control mechanisms within the crossbar architecture keep sender flits queued and ready to be sent. A reasonable amount of oversupply is thus possible before queuing inefficiencies begin to adversely effect router performance.

The herein disclosed systems and methods can be used not only in microprocessors, but in any computing environment, particularly in computing environments in which the speed of data supplied to a device is slower than the speed of the device, to more closely match the speed of the data to the speed of the device and thereby improve device efficiency.

Various modifications and variations can be made in the herein disclosed systems and methods without departing from the spirit or scope of the herein disclosed systems and methods. Thus, it is intended that the herein disclosed systems and methods cover such modifications and variations.

The herein disclosed systems and methods can be realized using a computer readable medium having computer readable instructions to instruct a computer to perform a method comprising providing an interleaving mechanism operable to provide instructions to the computing environment to communicate data having the same selected destination from one or more inputs having one or more data channels of the interleaving mechanism to one or more selected outputs of the interleaving mechanism, providing an interleaving instruction set that provides one or more instructions to the interleaving mechanism to interleave data from one or more sources comprising the one or more inputs and the one or more data channels, receiving first data from a first data channel of a first input by the interleaving mechanism, receiving second data from a first data channel of a second input by the interleaving mechanism, determining if the first data and second data have the same selected destination information, and interleaving the first data and second data upon determining that the first data and second data have the same selected destination information by the interleaving mechanism.

What is claimed is:

1. A system for interleaving data comprising:
    an interleaving mechanism having a plurality of inputs and one or more outputs, wherein the communication speed of output devices coupled to the outputs is greater than the communication speed of input devices coupled to the inputs, operable to interleave data being communicated from the inputs to the outputs according to a selected interleaving protocol; and
    an interleaving instruction set operable on the interleaving mechanism providing operating instructions to the interleaving mechanism in accordance with the selected interleaving protocol wherein the data can be interleaved between data channels and within at least one of the data channels, each output comprising at least one data channel.

2. The system as recited in claim 1 wherein the interleaving mechanism comprises a cross bar (XBAR).

3. The system as recited in claim 2 wherein the XBAR operates to controllably direct the data received from more than one of the inputs to one of the outputs.

4. The system as recited in claim 3 wherein the XBAR receives the data at the inputs in packets.

5. The system as recited in claim 4 wherein data of a packet directed through the XBAR in one clock cycle comprises a flit.

6. The system as recited in claim 5 wherein each of the packets comprises one or more flits.

7. The system as recited in claim 6 wherein the XBAR maintains a plurality of input interleave slots, each slot for use in delivering a flit of the data received at the inputs to the selected output.

8. The system as recited in claim 7 wherein the XBAR controllably sends the flit of data to the selected output during a data transmission cycle.

9. The system as recited in claim 8 wherein the XBAR rotates from one of the inputs to another of the inputs in successive data transmission cycles.

10. The system as recited in claim 9 wherein the XBAR rotates though the inputs using a round-robin scheme.

11. A method for interleaving data from a plurality of inputs to one or more outputs of an interleaving mechanism, wherein the communication speed of output devices coupled to the outputs is greater than the communication speed of input devices coupled to the inputs, the method comprising:
    receiving at least one data packet at more than one of the inputs;
    forming one or more flits from each received packet;
    interleaving the flits between one or more data channels and within at least one of the data channels, each output comprising at least one data channel;
    controllably communicating the interleaved flits to one of the outputs;
    reassembling the data packets from the communicated flits; and
    communicating the reassembled packets to the device coupled to the selected output.

12. The method as recited in claim 11 wherein the communicating step comprises routing the flits in a crossbar (XBAR).

13. The method as recited in claim 11 further comprising buffering one or more of the reassembled data packets before they are communicated to the device coupled to the selected output.

14. The method as recited in claim 13 further comprising providing control signals indicating interleaving slots for use in interleaving the flits.

15. The method as recited in claim 14 further comprising rotating between the inputs in successive data transmission cycles.

16. The method as recited in claim 15 wherein the rotating uses a round-robin scheme.

17. A computer readable medium having computer readable instructions to instruct a computer to perform a method comprising:

providing an interleaving mechanism having a plurality of inputs and one or more outputs, operable to controllably direct data from more than one of the inputs using one or more data channels to one of the outputs, wherein each output comprises at least one data channel, and wherein the speed at which the data is communicated by the selected output to a device coupled to that output is greater than the speed at which the data was received at the inputs;

providing an interleaving instruction set that provides one or more instructions to the interleaving mechanism to interleave data from one or more sources comprising the inputs and the one or more data channels;

receiving first data from a first data channel of a first input by the interleaving mechanism;

receiving second data from a first data channel of a second input by the interleaving mechanism;

determining if the first data and second data have the same selected destination information; and interleaving the first data and second data within a single data channel along flit boundaries upon determining that the first data and second data have the same selected destination information by the interleaving mechanism.

18. A system to interleave data within one or more data channels comprising:

a first means for accepting data packets from a plurality of sources and directed to one or more destinations, wherein the communication speed of the destinations is greater than the communication speed of the sources; and a second means for interleaving the accepted data, wherein the second means operates to interleave flits of the accepted data within at least one of the one or more data channels, and wherein each destination comprises at least one data channel.

19. The system as recited in claim 18 further comprising a third means for routing the interleaved data to their destinations.

20. The system as recited in claim 18 further comprising a fourth means for reassembling the interleaved data into data packets.

* * * * *

UNITED STATES PATENT AND TRADEMARK OFFICE
CERTIFICATE OF CORRECTION

PATENT NO. : 7,451,260 B2 Page 1 of 1
APPLICATION NO. : 11/584943
DATED : November 11, 2008
INVENTOR(S) : Christopher L. Lyles et al.

It is certified that error appears in the above-identified patent and that said Letters Patent is hereby corrected as shown below:

In column 6, line 43, in Claim 10, delete "though" and insert -- through --, therefor.

Signed and Sealed this

Nineteenth Day of May, 2009

JOHN DOLL
*Acting Director of the United States Patent and Trademark Office*